April 6, 1965     T. F. CALDWELL     3,176,676
PORTABLE GRILL
Filed July 5, 1963     3 Sheets-Sheet 1
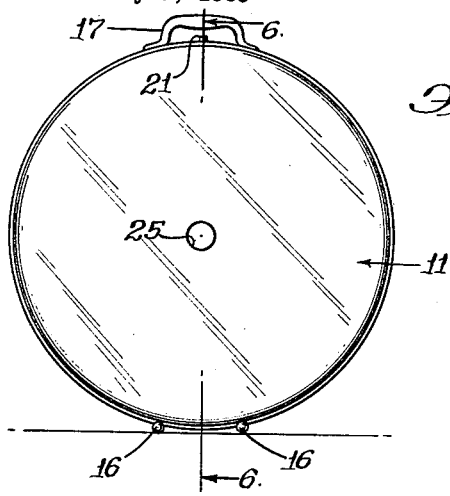
Fig. 1.
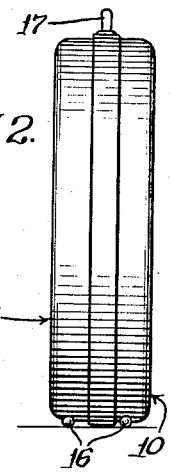
Fig. 2.
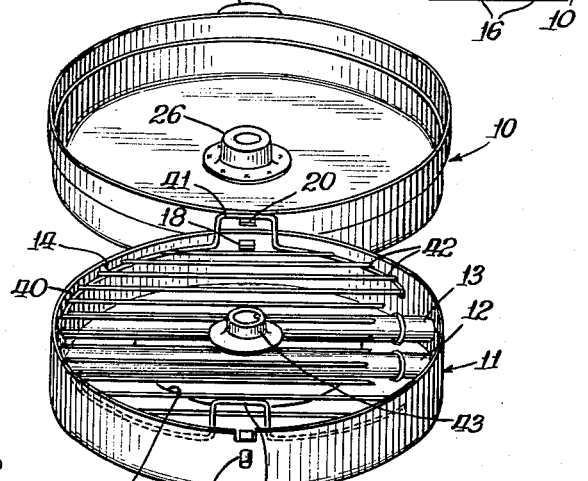
Fig. 3.
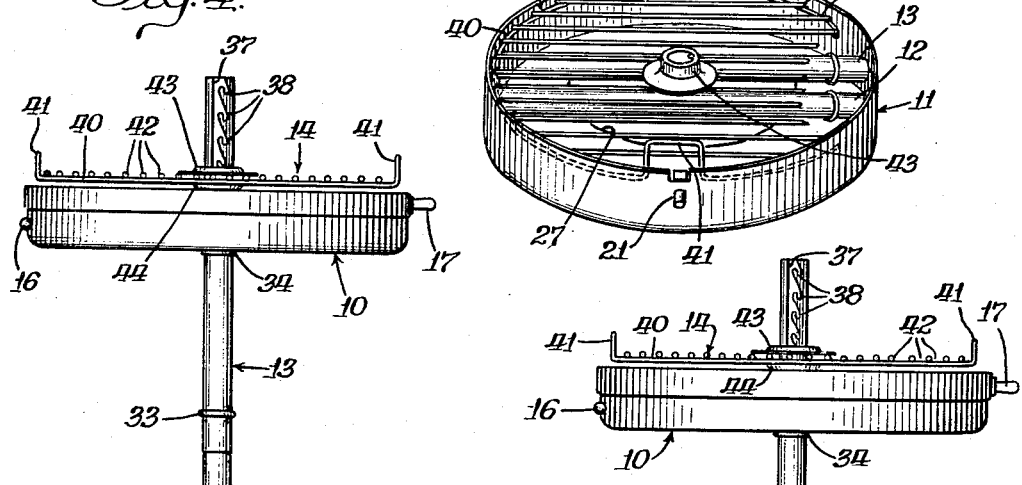
Fig. 4.
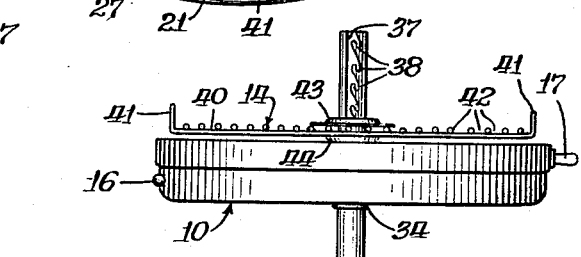
Fig. 5.
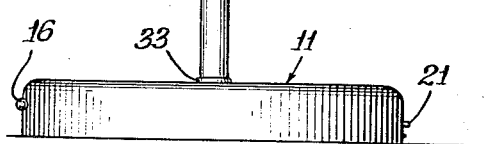
Inventor:
Thomas F. Caldwell
By Snow and Benno
Attys.

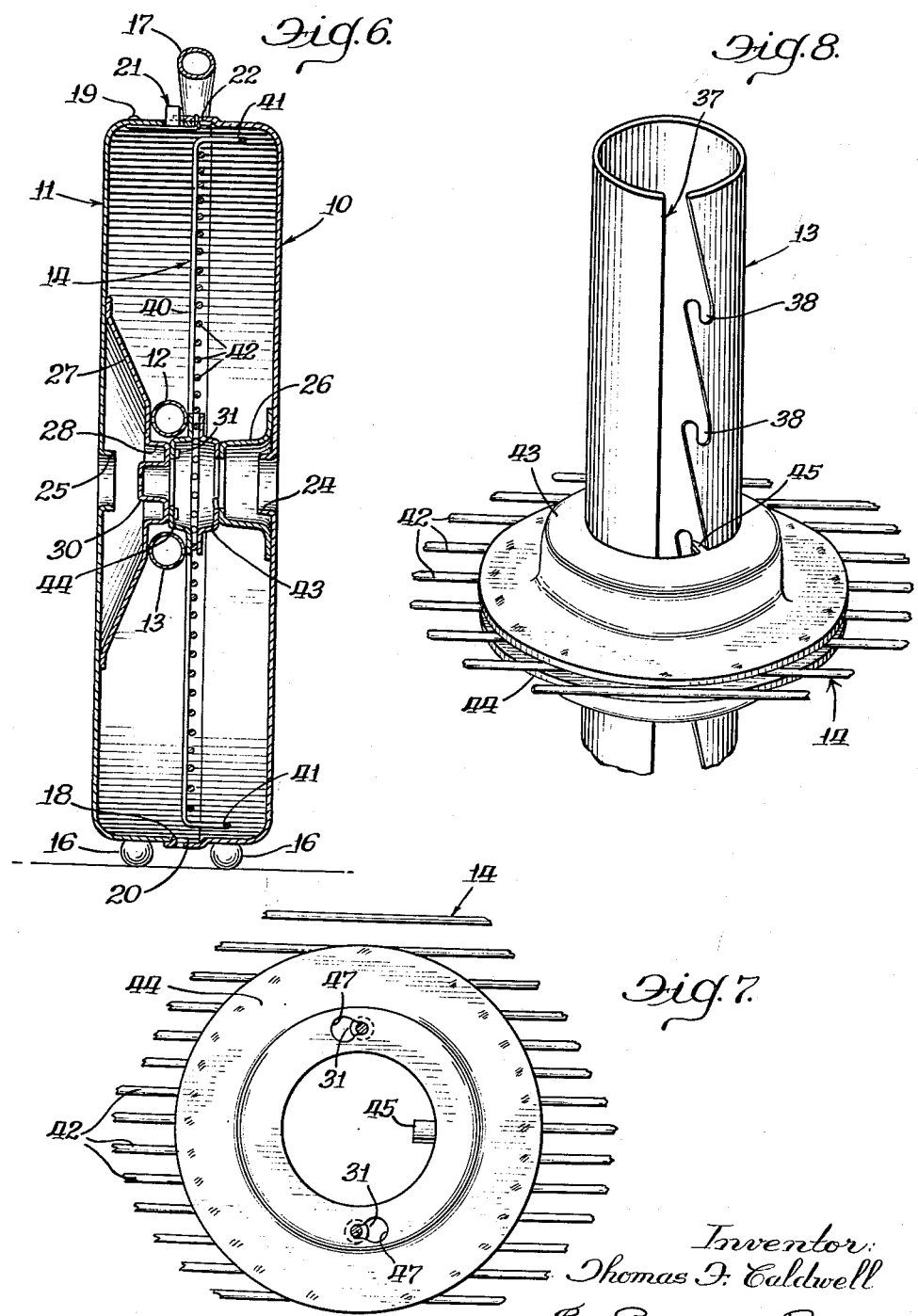

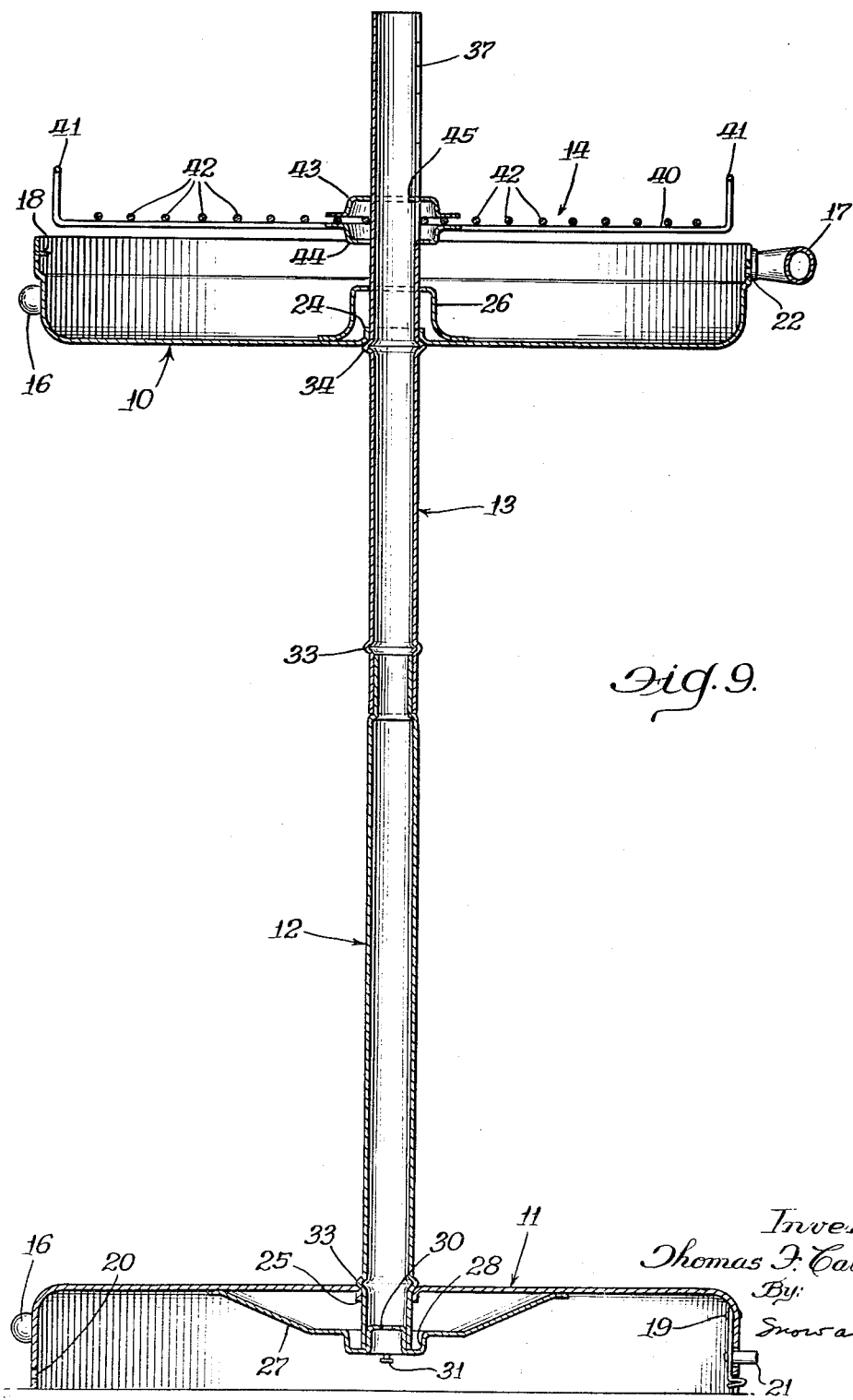

United States Patent Office 3,176,676
Patented Apr. 6, 1965

3,176,676
PORTABLE GRILL
Thomas F. Caldwell, Chicago, Ill., assignor to Electri-Flex Co., a corporation of Illinois
Filed July 5, 1963, Ser. No. 292,885
7 Claims. (Cl. 126—25)

This invention relates generally to portable grills of the type commonly used to cook or barbeque food on a wire grill suspended over a layer of burning charcoal, and more particularly to such portable grills of the knockdown or separable type which may be easily carried.

The primary object of the present invention is to provide a novel construction for a portable grill which will permit the grill to be easily disassembled and reassembled with all of the parts thereof forming a relatively small and compact package for easy carrying thereof.

It is a further object to provide a novel arrangement in a grill of the preceding paragraph which may be assembled to permit the grill to stand upon the ground for cooking of food at a convenient height therefrom, or which alternatively may be assembled to stand on a table to permit cooking at a convenient height above the table.

It is a further object to provide a novel arrangement according to the preceding paragraph wherein the grill may be used on a combustible table with a minimum danger of radiation of heat from the underside of the charcoal carrying bowl portion burning or overheating the tabletop.

It is a further object to provide a novel arrangement of a portable grill of a bowl section and a base section which may easily be locked together with the remaining parts of the grill therebetween to form a convenient container for carrying of the grill.

It is a further object to provide a novel arrangement for a portable grill wherein the parts thereof may be easily disassembled and reassembled in an interlocking arrangement to provide a unitary package for easy carrying of the grill in the disassembled condition.

It is a further object to provide a novel leg assembly for a portable grill according to any of the preceding paragraphs.

It is a further object to provide a novel arrangement for raising and lowering the wire grill relative to the fire bowl of a portable grill of any of the preceding paragraphs.

Other objects and features of the present invention will be apparent upon a perusal of the following specification and drawing in which:

FIGURE 1 is a side elevational view of the portable grill of the subject invention arranged in the position for carrying thereof;

FIGURE 2 is an end elevational view of the structure shown in FIGURE 1;

FIGURE 3 is an isometric view of the structure shown in FIGURES 1 and 2 with the bowl section separated from the base section and showing the arrangement of the wire grill and legs locked within the base section;

FIGURE 4 is a side elevational view of the assembled condition of the structure of FIGURES 1 through 3 with a long leg arrangement between the bowl section and the base section;

FIGURE 5 is a view similar to FIGURE 4 but showing the assembled condition of the structure with a short leg arrangement;

FIGURE 6 is a cross-sectional view of the structure shown in FIGURE 1;

FIGURE 7 is an enlarged bottom plan view of the center portion of the wire grill;

FIGURE 8 is an enlarged isometric view of the wire grill adjusting assembly of FIGURES 4 and 5; and FIGURE 9 is an enlarged cross-sectional view of the structure shown in FIGURE 4.

The present embodiment is the preferred embodiment, but it is to be understood that changes can be made in the present embodiment by one skilled in the art without departing from the spirit and scope of the present invention.

Generally the invention comprises a shallow circular bowl section, a shallow circular base section, two tubular leg sections, and a wire grill. The bowl and base sections are adapted to be secured together to form a closed container, and in the closed condition thereof the wire grill and the two leg sections are securely carried therein. A handle is provided on the outer periphery of the bowl section to permit the closed container of the bowl and base sections to be conveniently carried in an upright position. The outer peripheral portions of the bowl and base sections opposite from the handle are provided with leg members permitting the closed container of the bowl and base sections to stand in an upright position.

The bowl and base sections are each provided with an axial hole therethrough, and each hole is provided with a sleeve member secured over the inner side of the hole. The sleeve member in the base section is shaped substantially different from the sleeve member of the bowl section. The sleeve member in the base section is provided with a pair of projecting lug or key members which extend upwardly therefrom when the base section is positioned in an upwardly opening position. The upwardly projecting key members are adapted to engage a pair of key slots formed in the annular wire grill support member which forms a part of the wire grill and is disposed in the center thereof. This arrangement permits the wire grill to be keyed or locked within the base section.

The two tubular leg sections are of substantially the same length, and are slightly shorter in length than the inner diameter of the base section. This arrangement permits the two leg sections to be carried within the base section between the sleeve thereof and the underside of the wire grill when the wire grill is keyed or locked within the base section. This arrangement of the wire grill and the two leg sections is particularly shown in FIGURE 3. When the wire grill is locked within the base section, the handle portions of the wire grill loop about the locking members which are provided for securing the bowl and base sections together. This arrangement insures that there is no interference by the wire grill with the locking members for the base and bowl sections.

The length of the two tubular leg sections is further importantly correlated to the assembly arrangement of the grill for convenient use of the grill in two different assembled conditions for convenient support of the bowl section at one height from ground level and at another height from the top of a table. One end of each of the leg sections is provided with an annular flange spaced a certain distance from the end of the leg section. That one end of each of the leg sections is insertable through the opening of the base section when the base section is positioned in an overturned position. The annular flange will engage the upper surface of the base section and the portion of the leg section extending through the hole will fit within an annular ring formed in the sleeve member of the base section to securely hold the base section in an upright position. The upper end of the lower leg section is reduced in diameter for a portion of the length thereof to enable the upper portion of the lower leg to fit within the lower end of the upper leg section in a telescoping arrangement. The upper leg section is provided with a second annular flange intermediate the ends thereof, and the bowl section may be slid over the upper end of the upper leg section until the bowl section engages the second flange on the upper leg section to support the bowl section at a convenient height from ground level. The sleeve in the upper bowl section securely positions the bowl section in a substantially horizontal plane.

The portion of the upper leg section extending upwardly from the second flange is provided with certain means for spacing the wire grill from the upper bowl section. That means comprises a longitudinally extending slot formed through one side wall of the upper portion of the upper leg section, with one side wall of the slot being formed to have a plurality of shouldered downwardly extending notches. The notches are formed in an evenly spaced apart arrangement.

The wire grill is formed of a wire ring with integrally formed upwardly extending handles and a plurality of spaced apart wires upon which food may be placed. The center of the wire grill is provided with a pair of annular support members which are axially secured together on each side of wire grill. The opening through the annular wire grill support members is substantially equal to the outer diameter of the upper leg section, and one side of the hole through the upper annular wire grill support member is provided with an inwardly extending tab which is capable of entering into any one of the notches of the upper leg section. It may be therefore seen that the spacing between the wire grill and the upper bowl section will be dependent upon the particular notch of the upper leg section in which the tab is carried. To raise or lower the wire grill it is merely necessary to slightly raise the wire grill and then rotate the wire grill until the tab enters the vertical slot of the upper leg section. The wire grill may then be raised or lowered to a desired height, and the wire grill may then be rotated in an opposite direction to insert the tab into the notch for the selected height.

When the grill is to be used from a position resting upon a table, the base section is placed upon the table, the lower leg section is removed, and the lower end of the upper leg section is inserted into the hole of the base section. This arrangement is shown in FIGURE 5. The grill of the subject invention is ideally suited for tabletop use because of the insulating effect of the base section in preventing any substantial radiation of heat from the underside of the bowl section from striking the tabletop beneath the upper bowl section.

The novel details in the construction and arrangement of the invention will be readily apparent from the hereinafter following detailed description. The various parts of the grill are a bowl section 10, a base section 11, a lower leg section 12, an upper leg section 13, and a wire grill 14. The bowl and base sections 10 and 11 may be formed of any suitable material such as steel which may thereafter be coated with various materials such as porcelain or paint. The bowl and base sections 10 and 11 are substantially circular with shallow integrally formed side walls. The side wall of the bowl section 10 is provided with a shoulder with the inner diameter of the shoulder substantially equal to the outer diameter of the side wall of the base section 11. This arrangement permits the bowl and base sections 10 and 11 to nest together to form a closed container as shown in FIGURES 1, 2 and 6. Two leg members 16 are provided on the outer side of the side walls of the bowl and base sections 10 and 11. The leg members 16 permit the bowl and base sections 10 and 11 to stand in an upright position. The leg members 16 need not be attached to the bowl and base sections 10 and 11 but may be integrally formed as projections of the side walls thereof. The side wall portion of the bowl section 10 diametrically opposite from the leg members 16 is provided with a handle 17 which permits the closed arrangement of the bowl and base sections 10 and 11 to be conveniently carried thereby.

The side wall of the bowl section 10 between the leg members 16 is provided with an inwardly extending tab 18 which may easily be seen in FIGURE 6. The side wall of the base section 11 between the leg members 16 is provided with a hole 20 into which the tab 18 of the bowl section 10 will project when the bowl and base sections 10 and 11 are nested together as shown in FIGURE 6. In the nested or closed position of the bowl and base sections 10 and 11, the bowl and base sections 10 and 11 are further locked together by a lock arrangement 21. The lock arrangement 21 comprises a leaf spring member which is secured at one end thereof by a fastener 19 to the inner side of the side wall of the base section 11 on the side thereof diametrically opposite from the leg members 16. The other end of the leaf spring member is provided with a pawl which extends through a slot formed in the wall of the base section 11 and outwardly thereof. The pawl will enter a small opening 22 formed through the shoulder of the bowl section 10 in peripheral alignment with the pawl when the bowl and base sections 10 and 11 are pushed together to lock those sections together. The pawl of the leaf spring is released from the hole 22 by means of a button which is secured to the leaf spring member and extends through a hole in the side wall of the base section 11. By manually pressing the button downwardly or toward the side wall of the base section 11, the pawl will be withdrawn from the hole 22 in the bowl section 10, and the bowl and base sections 10 and 11 may be then be partially separated thereat, and completely separated when the base section 11 is removed from the tab 18 of the bowl section 10.

The center of the bowl section 10 is provided with a hole 24 with the edges thereof turned inwardly. The center of the base section 11 is provided with a hole 25 with the edges thereof turned inwardly. The holes 24 and 25 are substantially of the outer diameter of the tubular leg sections 12 and 13. The bowl section 10 is also provided with an annular somewhat cup-shaped sleeve 26. The sleeve 26 has an opening therethrough which is substantially of the diameter of the leg sections 12 and 13. The sleeve 26 is secured to the inner side of the bowl section 10 with the opening through the sleeve 26 in axial alignment with the opening 24.

The base section 11 is further provided with a sleeve member 27. The sleeve member 27 is somewhat dish-shaped and is secured to the inner side of the base section 11 and centered over the opening 25. The central portion of the sleeve member 27 is provided with an annular groove 28 formed about a short tubular projection 30. The tubular projection 30 extends toward the opening 25 and has an outer diameter substantially equal to the inner diameter of the tubular leg sections 12 and 13. This arrangement provides that when the base section 11 is positioned in an overturned condition such as shown in FIGURE 9, the lower end of either leg section 12 or 13 may be received through the hole 25 and into the annular groove 28 with the tubular projection 30 being received within the lower end of the leg section. The tubular projection 30 functions to pilot the leg section 2 to accurately align the leg section along the axis of the base section 11. The end of the tubular projection 30 is provided with a small drain hole. The relatively large diameter of the sleeve 27 further provides for accurate axial alignment of the upwardly extending leg section and further renders the base section 11 sufficiently rigid and substantially free from distortion. The inner end of the sleeve 27 is further provided with a pair of key members 31, the function of which will be described below.

The two tubular leg sections 12 and 13 are substantially equal in length. An annular flange 33 is formed about each leg section 12 and 13 near the lower end thereof. As may be seen in FIGURE 9, when the lower leg section 12 is inserted in the base section 11, the flange 33 substantially engages the surface of the base section 11 about the hole 25. The upper end of the lower leg section 12 is reduced in diameter so that the outer diameter thereof is substantially equal to the inner diameter of the upper leg section 13. This permits the upper leg section to be placed upon the upper end of the lower leg section 12 in a telescoping arrangement as may easily be seen in FIGURE 9. A second annular flange 34 is formed or otherwise provided on the upper leg section 13 intermediate the ends thereof. If the bowl section 10 is slid over the upper end of the upper leg section 13, the upper bowl section 10 will be supported on the upper leg section 13 with the annular flange 34 engaging the surface of the bowl section 10 about the hole 24. The length of the lower and upper leg sections 12 and 13 is such that when the lower end of the lower leg section 12 is inserted in the base section 11, with the lower end of the upper leg section placed over the upper end of the lower leg section 12, and with the bowl section 10 placed upon the upper leg section 13 and resting upon the flange 34, the bowl section 10 will be positioned at a convenient cooking height from ground level. The length of the leg sections 12 and 13 is further such that both leg sections 12 and 13 in a disassembled condition may be placed within the base section 11 for storage. When the grill is to be used on a tabletop, the lower leg section 12 is removed and the lower end of the upper leg section 13 is inserted in the base section 11. As may be seen in FIGURE 5 with the base section 11 resting upon a tabletop 36, the base section 11 by virtue of its overturned position with merely the edge of the side walls engaging the tabletop 36, and by virtue of its diameter which is substantially equal to the diameter of the bowl section 10, will substantially prevent any radiated heat from the underside of the bowl section 10 from striking and possibly overheating the tabletop 36.

The portion of the upper leg section 13 extending above the upper bowl section 10 is provided with a longitudinally extending slot 37 which may be seen in enlarged detail in FIGURE 8. One side wall of the slot 37 is provided with a plurality of vertically spaced apart notches 38. The vertical portions of the wall of the slot 37 between the notches 38 are sloped inwardly and downwardly to provide for guided entrance to any one of the notches 38. The slot 37 and the notches 38 provide means for adjusting the height of the wire grill 14 from the bowl section 10.

The wire grill 14 comprises a wire ring 40 of a diameter slightly less than the inner diameter of the bowl section 10. On two diametrically opposed sides of the ring 40, integral handles 41 are formed therein. A plurality of food supporting wires 42 are secured in a parallel spaced apart relationship to each other to the wire ring 40. The center of the wire grill is provided with a pair of annular support members 43 and 44. The annular support member 43 is positioned on the upper side of the wires 42 and the annular support member 44 is positioned on the underside of the wires 42 in axial alignment with the upper support member 43. The two support members 43 and 44 may then be secured together by any means such as spot welding to form the complete assembly of the wire grill 14. The upper support member 43 is provided with a tab 45 which extends inwardly thereof. The tab member 45 is slightly twisted to permit its easy entrance into one of the notches 38. When the wire grill 14 is inserted over the upper end of the upper leg section 13 as shown in the drawings, the wire grill 14 is supported on the upper leg section 13 by the positioning of the tab member 45 in one of the notches 38. From the foregoing it may be seen that the adjusted height of the wire grill 14 may be easily changed by slightly raising and turning the wire grill 14 to remove the tab 45 from one of the notches 38 and to position the tab 45 within the slot 37. The wire grill 14 may then be manually raised or lowered with the tab 45 moving vertically in the slot 37 to a new adjusted position. The wire grill 14 is then rotated to place the tab 45 into an adjacent notch 38 to thereby support the wire grill 14 in the new adjusted position thereof.

The thickness of the two support members 43 and 44 is such that the total depth of the sleeves 26 and 27 of the bowl and base sections 10 and 11, respectively, and the support members 43 and 44 is substantially equal to the distance between the bowl and base sections 10 and 11 in the closed condition thereof as may be seen in FIGURE 6. The inner marginal edge portion of the lower support member 44 is provided with a pair of diametrically opposed key slots 47. Those key slots 47 are shown in FIGURE 7 with the key members 31 locked in the key slots 47. The key members 31 have been described above as secured to the inner end of the sleeve 27 of the base section 11. In the disassembly of the grill for compact carrying thereof, the two leg sections 12 and 13 are placed within the base section 11 on each side of the center portion of the sleeve 27. The wire grill 14 is then inserted partially within the base section 11 with the key slots 47 engaging the key members 31 and being locked thereon by a slight rotation of the wire grill 14. The bowl and base sections 10 and 11 may then be locked together to form the compact carrying arrangement shown in FIGURES 1, 2 and 6. In addition to locking the wire grill 14 and the leg sections 12 and 13 securely within the base section 11, the key members 31 and the key slots 47 further serve to align the wire grill 14 so that the handle portions 41 thereof loop about the locking means for locking the bowl and base sections 10 and 11 together. The result of this arrangement is to provide that the locking means for the bowl and base sections 10 and 11 may be easily operated without any interference from the wire grill 14.

Having described the invention what is considered new and desired to be protected by Letters Patent is:

1. In a portable grill, a base section comprising a circular plate having a depending annular wall, a bowl section comprising a circular plate having an upwardly extending annular wall of a diameter permitting said base and bowl sections to be placed together to define a closed container, upper and lower leg sections being formed to permit an end to end connection thereof to define a leg assembly, means in the plate of said base section for receiving and supporting said leg assembly in an upright position, means in the plate of said bowl section for permitting said bowl section to be carried on the upper portion of said leg assembly with the upper end of said leg assembly extending above said bowl section, a grill, means in the center of said grill adapted to cooperate with said means formed on the portion of said leg assembly extending above said bowl section for adjustably supporting said grill over said bowl section, said last mentioned means being formed to operate responsive to a rotation of said grill relative to said leg assembly in one direction to free said grill for movement longitudinally of said leg assembly and to operate responsive to a rotation of said grill relative to said leg assembly in the opposite direction to lock said grill against movement longitudinally of said leg assembly.

2. In a portable grill, a base section comprising a circular plate having a depending annular wall, a bowl section comprising a circular plate having an upwardly extending annular wall of a diameter permitting said base and bowl sections to be placed together to define a closed container, upper and lower leg sections being formed to permit an end to end connection thereof to define a leg assembly, said upper and lower leg sections being formed of a length to permit said leg sections to be stored within said base section in a side by side arrangement, means in said base section for receiving and supporting said leg assembly in an upright position, means in said bowl section for permitting said bowl section to be carried on the upper portion of said leg assembly with the upper end of said leg assembly extending above said bowl section, and a wire grill, said wire grill being formed of a diameter to permit said wire grill to be placed within said base section over said upper and lower leg sections when said upper and lower leg sections are stored in said base section for storage of said wire grill therein, means in the center of said wire grill adapted to cooperate with means formed on the portion of said leg assembly extending above said bowl section for adjustably supporting said wire grill over said bowl section, locking means partially formed in said base section and partially formed on the center of said wire grill for locking said wire grill within said base section over said upper and lower leg sections for secure storage of said wire grill and said upper and lower leg sections within said base section, and second locking means formed partially on the annular wall of said bowl section and partially on the annular wall of said base section for locking said bowl and base sections together as a closed container.

3. In a portable grill, a base section comprising a circular plate having a depending annular wall, a bowl section comprising a circular plate having an upwardly extending annular wall of a diameter permitting said base and bowl sections to be placed together to define a closed container, a tubular upper leg section, a tubular lower leg section, said leg sections being of substantially the same diameter, the upper end of said lower leg section being formed of a reduced diameter to permit said upper end of said lower leg section to be inserted in the lower end of said upper leg section to define a leg assembly, an opening formed through the center of said plate of said base section, said opening being of a diameter substantially equal to the outer diameter of said upper and lower leg sections, a sleeve secured to the underside of said plate of said base section in axial alignment with the opening therethrough, said opening and said sleeve being formed to alternatively receive the lower end of said upper and lower leg sections to support one of said leg sections in an upright position, means in the center of said bowl section for permitting said bowl section to be carried on said upper leg section intermediate the ends thereof with the upper end of said upper leg section extending above said bowl section, a wire grill, means in the center of said wire grill adapted to cooperate with means formed on the portion of said upper leg section extending above said bowl section for adjustably supporting said wire grill over said bowl section, said sleeve being formed in the shape of a dish with the marginal edge thereof secured to the underside of said plate of said base section, and a circular projection extending upwardly from the center of said sleeve and in axial alignment with said opening through said plate of said base section, said projection having an outer diameter substantially equal to the inner diameter of said upper and lower leg sections, whereby the lower end of one of said leg sections is received on said projection to pilot the lower end of one of said leg sections to insure the support thereof in an upright position.

4. In a portable grill, a base section comprising a circular plate having a depending annular wall, a bowl section comprising a circular plate having an upwardly extending annular wall of a diameter permitting said base and bowl sections to be placed together to define a closed container, a tubular upper leg section, a tubular lower leg section, said leg sections being of substantially the same diameter, the upper end of said lower leg section being formed of a reduced diameter to permit said upper end of said lower leg section to be inserted in the lower end of said upper leg section to define a leg assembly, an opening formed through the center of said plate of said base section, said opening being of a diameter substantially equal to the outer diameter of said upper and lower leg sections, a sleeve secured to the underside of said plate of said base section in axial alignment with the opening therethrough, said opening and said sleeve being formed to alternatively receive the lower end of said upper and lower leg sections to support one of said leg sections in an upright position, means in the center of said bowl section for permitting said bowl section to be carried on said upper leg section intermediate the ends thereof with the upper end of said upper leg section extending above said bowl section, a wire grill, means in the center of said wire grill adapted to cooperate with means formed on the portion of said upper leg section extending above said bowl section for adjustably supporting said wire grill over said bowl section, an annular flange on the outer surface of said upper leg section intermediate the ends thereof, said means in said bowl section for permitting said bowl section to be carried on said upper leg section comprising an opening formed through the center of said plate of said bowl section, said opening in said bowl section being of a diameter substantially equal to the outer diameter of said upper leg section, a sleeve secured to the upper side of said plate of said bowl section in axial alignment with the opening therethrough, whereby said bowl section is mountable over the upper end of said upper leg section with said upper end of said upper leg section extending through said opening and said sleeve with the underside of said plate of said bowl section engaging said annular flange on said upper leg section intermediate the ends thereof.

5. In a portable grill, a base section comprising a circular plate having a depending annular wall, a bowl section comprising a circular plate having an upwardly extending annular wall of a diameter permitting said base and bowl sections to be placed together to define a closed container, a tubular upper leg section, a tubular lower leg section, said leg sections being of substantially the same diameter, the upper end of said lower leg section being formed of a reduced diameter to permit said upper end of said lower leg section to be inserted in the lower end of said upper leg section to define a leg assembly, an opening formed through the center of said plate of said base section, said opening being of a diameter substantially equal to the outer diameter of said upper and lower leg sections, a sleeve secured to the underside of said plate of said base section in axial alignment with the opening therethrough, said opening and said sleeve being formed to alternatively receive the lower end of said upper and lower leg sections to support one of said leg sections in an upright position, means in the center of said bowl section for permitting said bowl section to be carried on said upper leg section intermediate the ends thereof with the upper end of said upper leg section extending above said bowl section, a wire grill, means in the center of said wire grill adapted to cooperate with means formed on the portion of said upper leg section extending above said bowl section for adjustably supporting said wire grill over said bowl section, said means in the center of said wire grill adapted to cooperate with means formed on the portion of said upper leg section extending above said bowl section for adjustably supporting said wire grill over said bowl section comprising an annular support member assembly carried in the center of said wire grill with the opening therethrough of a diameter substantially equal to the outer diameter of said upper leg section, an inwardly extending tab carried on said annular support member assembly to extend inwardly thereof, a slot formed through the wall of said upper leg section and extending longitudinally thereof from the upper end to a point intermediate the ends thereof, a plurality of notches formed in a spaced apart relationship to each other in said upper leg section and communicating with said slot, said slot and said notches being formed to receive said tab, whereby said wire grill is movable upwardly and downwardly along said upper leg section when said tab is in said slot, and whereby said wire grill is supported over said bowl section when said tab is positioned in one of said notches.

6. In a portable grill as defined in claim 5, said leg sections being of a length less than the inner diameter of said annular wall of said base section, so that said leg sections are positionable in a parallel spaced apart relationship to each other in said base section on each side of the center portion of said sleeve, and locking means carried on the center portion of said sleeve and on one end of said annular support member assembly of said wire grill for locking said wire grill within said base section with said leg sections between said wire grill and said plate of said base section.

7. In a portable grill as defined in claim 6, wherein said means in said bowl section for permitting said bowl section to be carried on said upper leg section comprises, an opening formed through the center of said plate of said bowl section, said opening through said bowl section being of a diameter substantially equal to the outer diameter of said upper leg section, a sleeve secured to the upper side of said plate of said bowl section in axial alignment with the opening therethrough, said opening and said sleeve being formed to permit said bowl section to be received on said upper leg section, said sleeve in said bowl section being of a depth so that said sleeve of said bowl section substantially engages said annular support member assembly of said wire grill when said wire grill is locked within said base section and said base and bowl sections are placed together to define a closed container.

References Cited by the Examiner
UNITED STATES PATENTS

| | | | |
|---|---|---|---|
| 750,742 | 1/04 | Weston | 126—30 |
| 2,168,210 | 8/39 | Hawksley | 108—38 |
| 2,568,534 | 9/51 | Baker | 108—33 |
| 3,094,113 | 6/63 | Avila | 126—9 |

FOREIGN PATENTS 590,309  7/47  Great Britain.

JAMES W. WESTHAVER, Primary Examiner.